United States Patent

[11] 3,575,241

| [72] | Inventors | Charles E. McKeon<br>Birmingham;<br>William F. Lomas, Southfield; Willard G.<br>Smith, Detroit, Mich. |
|---|---|---|
| [21] | Appl. No. | 627,136 |
| [22] | Filed | Mar. 30, 1967 |
| [45] | Patented | Apr. 20, 1971 |
| [73] | Assignee | Ford Motor Company<br>Dearborn, Mich. |

[54] TRACTOR HYDRAULIC LIFT CONTROL SYSTEM
7 Claims, 6 Drawing Figs.

[52] U.S. Cl. .................................................. 172/3, 172/7

[51] Int. Cl. ...................................................... A01b 67/00, A01b 63/112

[50] Field of Search .......................................... 172/3, 7, 9, 11, 12, 4, 8, 10, 75, 83

[56] References Cited

UNITED STATES PATENTS

| 2,631,514 | 3/1953 | Roeder | 172/9 |
| 3,313,354 | 4/1967 | Jin | 172/12 |
| 2,654,301 | 10/1953 | Bohmker | 172/2 |

FOREIGN PATENTS

| 1,099,775 | 2/1961 | Germany | |

Primary Examiner—Robert E. Pulfrey
Assistant Examiner—Stephen C. Pellegrino
Attorneys—Peter F. Hilder and John R. Faulkner ABSTRACT: A tractor is provided with a torque-sensing device in the drive line to the tractor driving wheels to control operation of an implement hydraulic lift system for raising and lowering an implement as required to maintain a constant torque on the drive line. The system also provides for implement positioning responsive to position of a hand-operated quadrant lever and for positioning responsive to both drive line torque and quadrant lever position.

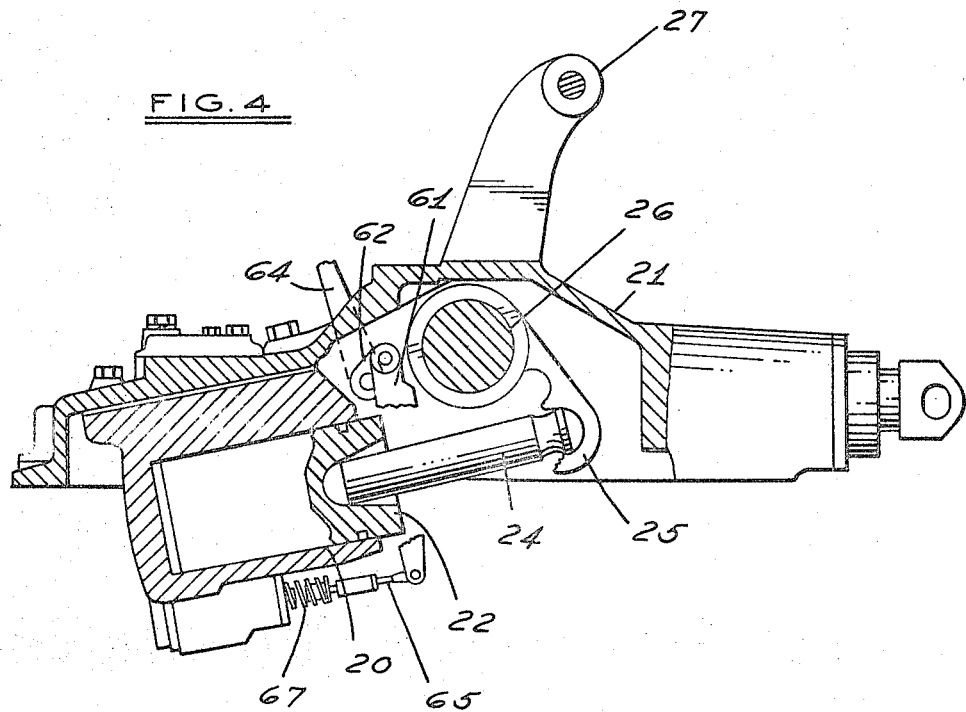
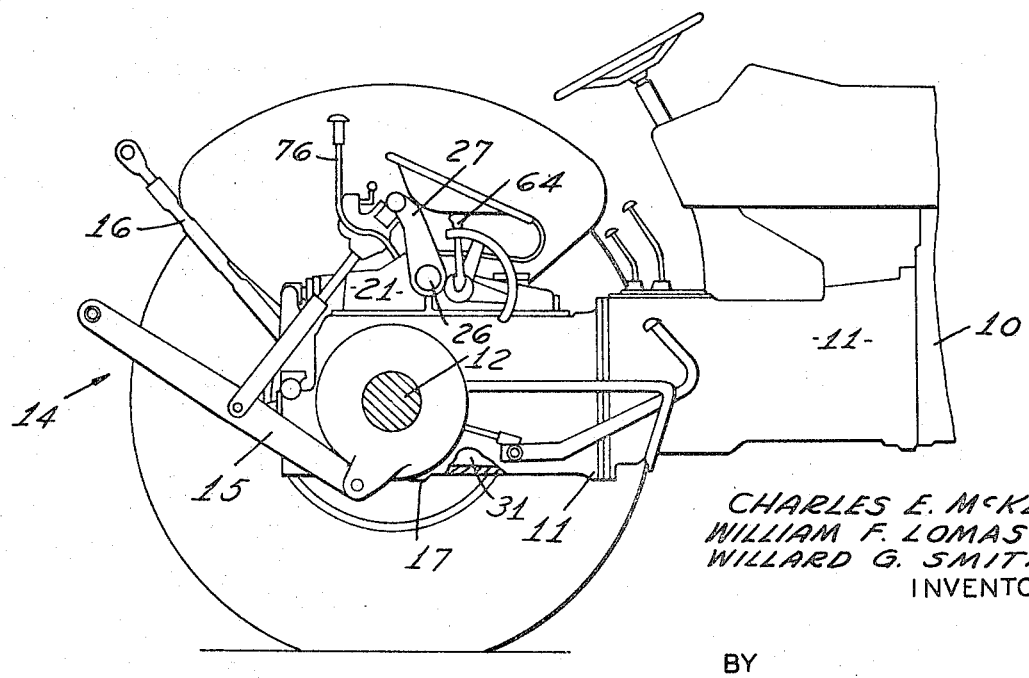

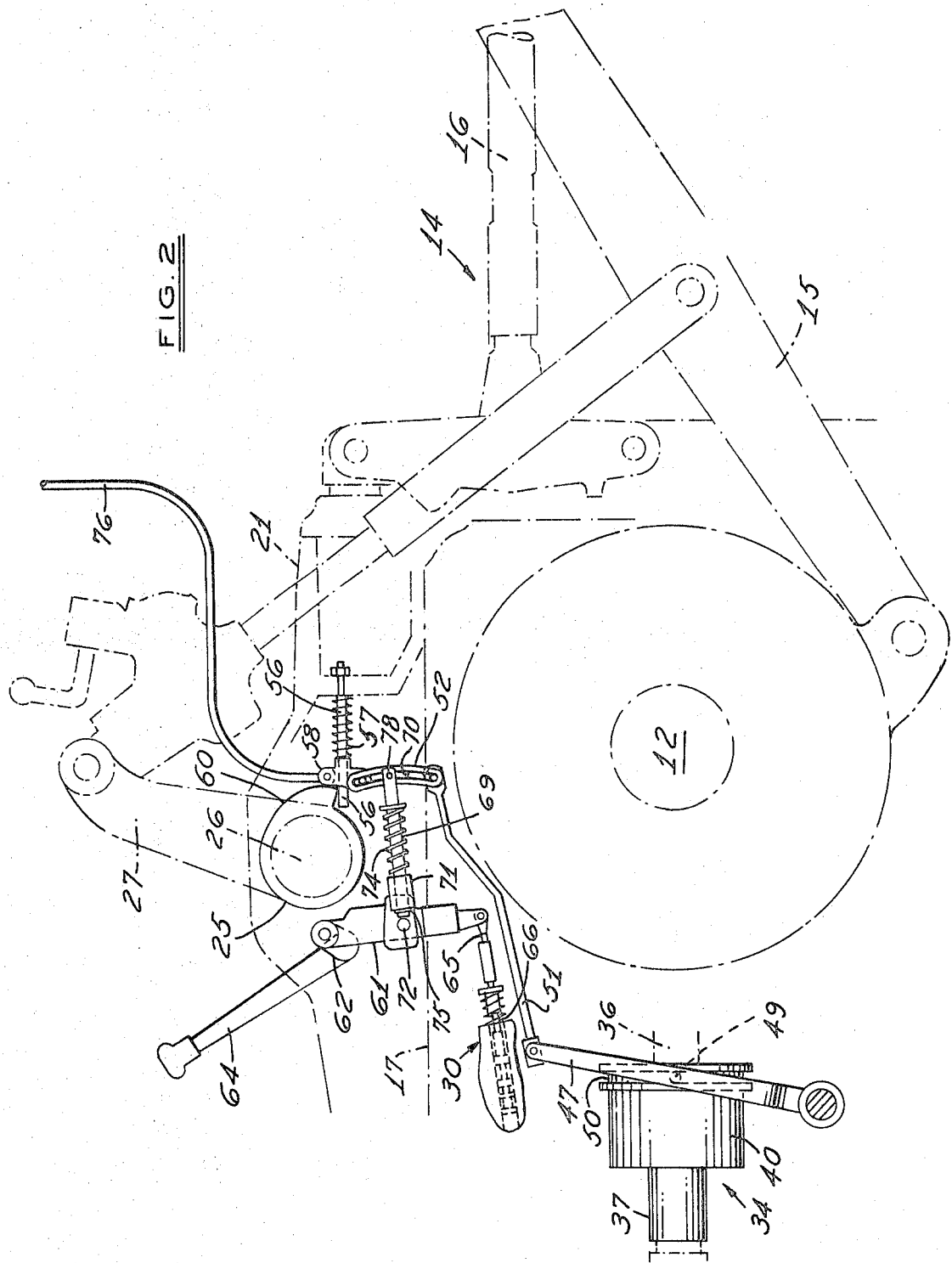

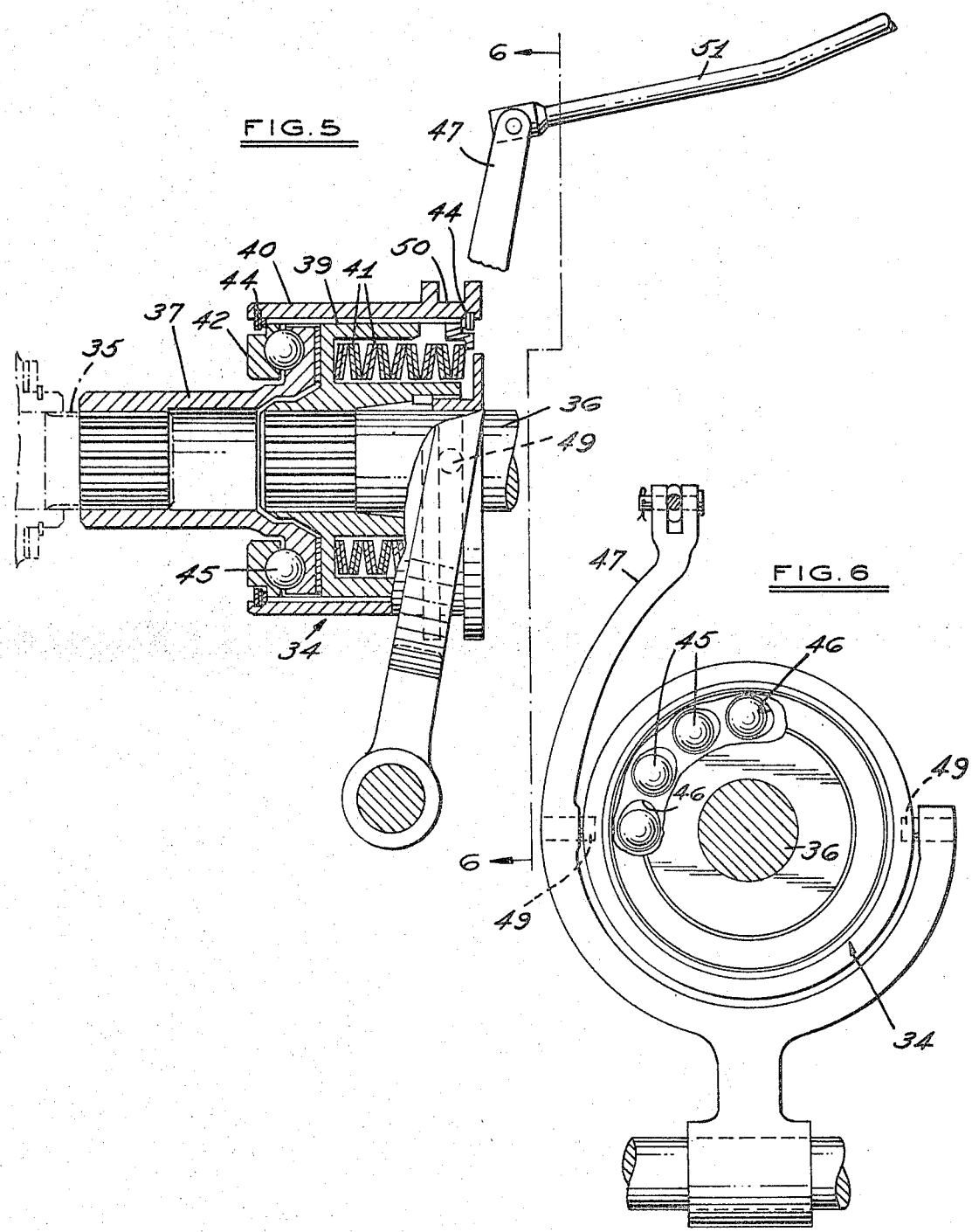

TRACTOR HYDRAULIC LIFT CONTROL SYSTEM

This invention relates to tractors, and more particularly to hydraulic lift systems for tractors.

Agricultural and general purpose tractors usually are provided with a power liftable hitch for supporting implements mounted on or attached to the tractor. It is usual to provide mechanism for automatically lifting or lowering the implement in order to maintain a more or less uniform implement draft or load on the tractor, which is measured by the force or reaction on the top or bottom links of the tractor hitch. Customarily, the force exerted on the tractor links is sensed by displacement of a spring and forces above or below that selected for operation result in raising or lowering the hitch to bring implement draft within the range selected.

According to the present invention, the driving effort of the tractor is sensed and the height of an implement connected to or carried by the tractor is adjusted to maintain the driving effort with the selected range. Preferably, this is done by sensing the torque in the drive line following or behind the transmission and automatically adjusting the height of the implement to maintain the torque within a selected range. By measuring torque rather than implement draft, the tractor may be operated closer to its maximum power output and the implement to be controlled need not be carried by the regular tractor hitch but may be attached anywhere on the tractor and the height of the implement controlled to maintain substantially uniform drive line torque.

In the form shown of the present invention, a torque-sensing coupling in the drive line controls a valve which regulates admission and exhaust of fluid from a lift cylinder connected to the tractor hitch. The valve also may be utilized to control flow of hydraulic fluid to and from any hydraulic cylinder, including a cylinder mounted on an implement connected to the tractor.

Among the objects of the present invention are to provide a tractor having means by which an attached ground-engaging implement is automatically raised or lowered in response to drive line torque of the tractor; to provide such a tractor in which an implement supporting hitch is raised or lowered in response to drive line torque; to provide an improved mechanism for sensing drive line torque of a tractor and control of height of an attached implement responsive thereto; and generally to improve tractors of the type described.

Other objects and objects relating to details and economies of construction will be more apparent from the description to follow.

The best form in which I have contemplated applying my invention is illustrated in the accompanying drawings forming a part of this specification in which:

FIG. 1 is a somewhat diagrammatic side elevation of a tractor according to the present invention.

FIG. 2 is an enlarged side elevation showing the rear portion of the drive shaft, rear axle ring and pinion, drive line torque sensing mechanism and associated parts, portions of the rear axle and implement supporting hitch being indicated.

FIG. 4 is a vertical section through the hydraulic lift cylinder cover and associated parts of the implement lift system.

FIG. 5 is a vertical section through the drive line torque-sensing mechanism, a portion of the drive shaft and the rear axle pinion shaft being shown in elevation.

FIG. 6 is an end elevation of the torque-sensing mechanism, a portion of the mechanism being broken away to show details of construction.

Figure 3:
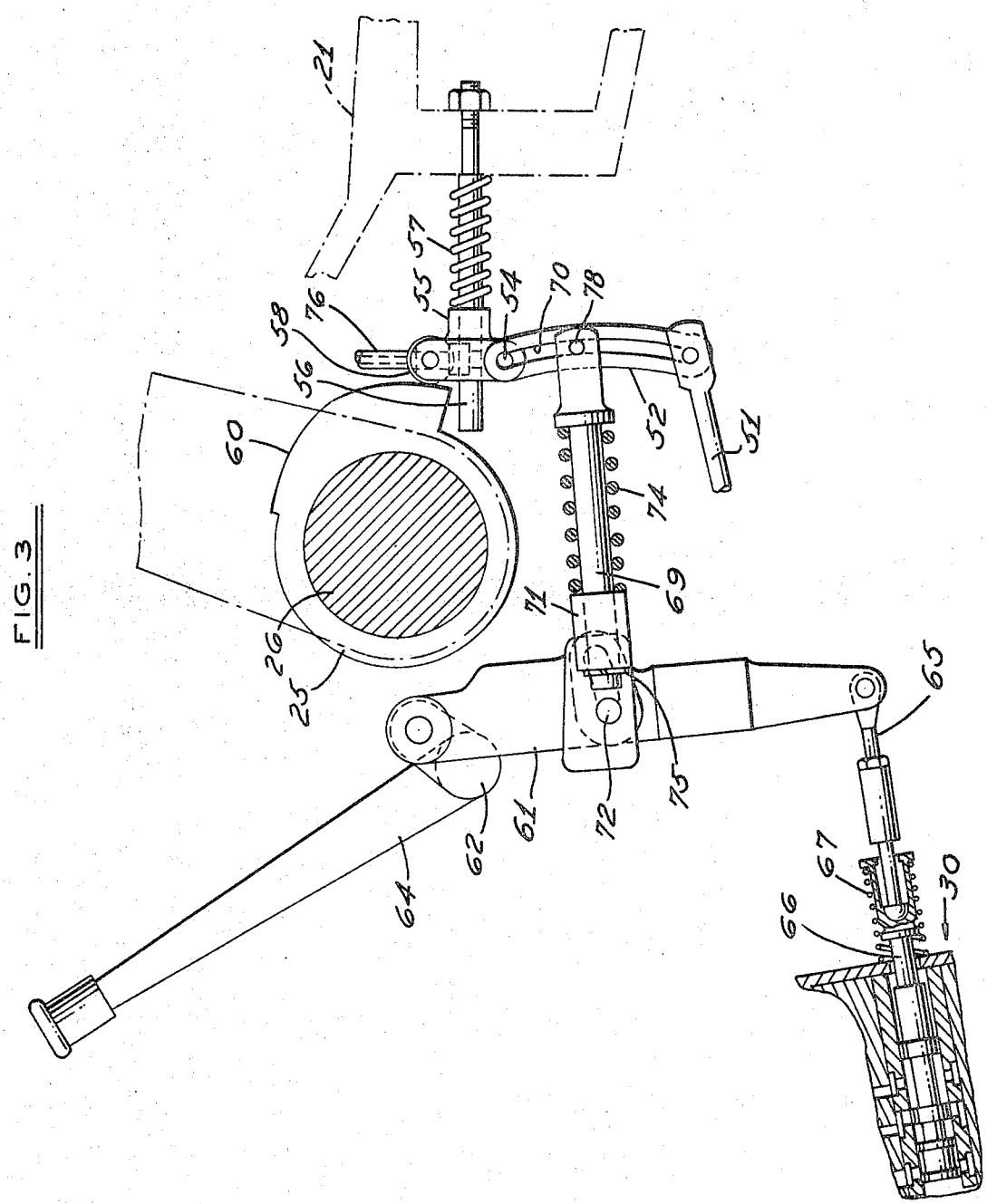
FIG. 3 is an enlarged side elevation of the control mechanism for the tractor hydraulic lift system, a lift arm and a portion of the center housing being indicated.

Referring now to FIG. 1, the tractor of the present invention is generally similar to the tractor shown in Roeder U.S. Pat. No. 2,631,514, having an engine 10, variable ratio transmission 11 and rear axle 12. An implement supporting hitch 14 may comprise a pair of lower links 15 and a top link 16 mounted for limited universal movement on the center housing 17 of the rear axle. An implement, e.g., a plow (not shown) may be mounted on the hitch 14.

The hitch 14 and attached implement may be raised by means of a hydraulic lift cylinder 20 mounted on the underside of the cover 21 of the center housing. A piston 22 within the cylinder 20 by means of a short rod 24 operates a ram arm 25 to rotate the rock shaft 26 journaled within the cover 21 counterclockwise as viewed in FIG. 4 to lift the implement.

The ends of the rock shaft 26 extend through the cover 21 and lift arms 27 are fixed thereto. Lift links 29 connect the outer ends of the lift arms to the lower links 15 for lifting the links responsive to rearward movement of the piston 22 within the lift cylinder.

A hydraulic valve 30, which may be of the spool valve type, regulates flow of hydraulic fluid from a source of fluid under pressure, e.g., a hydraulic pump (not shown) to the lift cylinder 20 and fluid from the cylinder 20 to a sump 31 in the bottom of the center housing. By operating the valve 30 in one direction, fluid under pressure is admitted to the lift cylinder 20 to raise the hitch, while operation of the valve in the other direction will release fluid from the lift cylinder 20 to permit the hitch 14 and supported implement to lower in response to force of gravity. In the neutral, intermediate position of the valve 30, the hydraulic fluid is trapped within the lift cylinder 20 to hold the hitch in adjusted position. The tractor as thus far described is well known and generally similar to the well-known Ford tractors presently sold throughout the world.

Referring now to FIGS. 2, 5 and 6, the tractor of the present invention is provided with a drive line torque-sensing device which may be in the form of a coupling 34 located behind the transmission and connecting the drive shaft 35 and the rear axle pinion shaft 36. The coupling 34 comprises a forward element 37 splined to the drive shaft 35 and a rearward element 39 splined to the pinion shaft 36. As shown, the forward element 37 is capable of limited circumferential movement in one direction relative to the element 39. The movement of the element 37 relative to the element 39 is in the direction of rotation of the drive shaft 35 when the tractor is moving in a forward direction and the degree of movement is proportional to the torque being transmitted through the drive shaft and the coupling 34.

An outer sleeve 40 is splined to rotate with the rearward element 39 of the coupling and is urged rearwardly by a spring 41 coaxial with the shaft 36 and mounted in the rearward element. The spring 41 may be formed of a stack of Belleville (conical) washers. A ring 42 at the forward end of the sleeve extends inwardly and in front of the forward element 37 of the coupling and is retained in position by snaprings 44. A series of balls 45 are interposed between the ring 42 and the forward element and are received within inclined ramps 46 formed in both the ring 42 and forward element 37. The ramps 46 extend only for a short distance and extend in one direction in the ring 42 and in the other direction in the forward element 37. If it is desired to sense drive line torque in either direction of rotation of the drive shaft 35, the ramps 46 may extend in both directions in both the ring 42 and the forward element 37. The arrangement is such that as torque is applied to the coupling 34, the balls 45 tend to roll up the ramps 46, separating the two mating parts 37 and 42. In doing this, a spring 41 is compressed which tends to resist the balls 45 from rolling up the ramps 46. The separating of the two mating parts 37 and 42 react on the sleeve 40, moving it axially. The higher the torque, the farther up the ramps 46 the balls 45 roll, separating the mating parts 37 and 42 and axially moving the sleeve farther. The degree of axial movement of the sleeve 40 is responsive to the amount of torque transmitted by the coupling 34.

The drive line torque sensed by the coupling 34 is utilized to control the valve 30 by means of linkage including an arm 47 mounted on a fixed pivot in the center housing 17 and having a pair of pins 49 engaged within a circumferential slot 50 in the sleeve 40 of the coupling. A link 51 extends rearwardly from the upper end of the arm 47 and is connected to a floating lever 52.

The upper end of the lever 52 is supported on a pivot 54 which is mounted on a bushing 55 slideable along a rod 56 fixed to the center housing. A spring 57 extending about the rod 56 presses a cam follower 58 mounted on the upper end of lever 52 against a position control cam 60 mounted on the rock shaft 26, which may form a portion of the ram arm 25. The cam 60 may be generally spiral in contour, as indicated. The position of lever 52 is responsive to the torque-sensing coupling 34 and the cam 60.

A valve control lever 61 has its upper end pivotally mounted on a crank 62 connected with a manually settable quadrant lever 64 mounted on the outside of the cover 21. Movement of the quadrant lever 64 adjusts the position of the top of the valve control lever 61 and adjusts the implement penetration that determines the torque at which the tractor is to operate, as will be described.

The lower end of the valve control lever 61 is connected by control rod 65 to the valve spool 66 of the valve 30 controlling passage of fluid to and from the lift cylinder 20. Preferably, the spool 66 is biased to dump position releasing fluid from lift cylinder by a spring 67.

Valve control lever 61 has an intermediate portion linked to the floating lever 52 by a rod 69 pivotally connected to the valve control lever. Preferably, the rod 69 is received within an arcuate slot 70 in the floating lever 52 and may be swung in an arc extending about the other end of the rod as a center so as to vary the mechanical advantage with which the link 51 operates the valve control lever 61.

An override connection is provided between the rod 69 and the valve control lever 61. This connection comprises a bushing 71 slideable along the rod 69 and having a pin 72 pivotally connected with the control lever 61. A spring 74 extending about the rod 69 presses the bushing 71 against a stop 75 at the end of the rod.

A push-pull cable 76 of the Bowden wire type attached to an end of a pin 78 on the end of rod 69 and received within the slot 70 may be used to position the end of the rod 69 anywhere along the slot 70. By lowering the end of the rod 69, movement of the rod will be more nearly equal to the movement of link 51, while raising of the rear end of the rod within the slot 70 will make the movement of the rod more responsive to position of the lower links of the tractor (position control). Intermediate positions afford a blending of the two types of control and movement to the extreme ends of the slot will yield pure torque control and pure position control. Preferably, however, the movement of the position control cam 60 is utilized to cut off lift and lowering signals of the torque-sensing device after a correction has been initiated and thus prevent "hunting" or overcorrecting.

In operation, raising the quadrant lever 64 to the top of its range of travel (transport position) will raise the tractor hitch to the top of its range of movement, at which time the piston 22 will engage the valve control lever 61 generally as described in Roeder, U.S. Pat. No. 2,631,514 to cut off the lift signal and restore the valve spool 66 to neutral position.

The drive line torque at which the tractor is to operate is selected by moving the quadrant lever 64 from its transport position down to some operating position. The further the quadrant lever is lowered, the greater will be the drive line torque at which the tractor is to operate. Such movement of the quadrant lever positions the upper end of the valve control lever 61 by means of the crank 62. This will rock the lever about an intermediate point 72 and permit the spring 67 to move the valve spool 66 to dump position, releasing hydraulic fluid from the lift cylinder 20 and permitting the implement hitch 14 to drop in response to gravity.

As the implement, in this case a plow, enters the ground, the drive line torque sensed by the coupling 34 will increase, moving the lower end of the floating lever 52 forwardly to the left as viewed in FIG. 3. At the same time, lowering of the hitch will rotate the cam 60 clockwise as viewed in FIG. 3, causing the upper end of floating lever 52 also to be moved to the left as viewed in FIG. 3. As the drive line torque increases and the hitch lowers, this movement of the lever 52 will force the valve control lever 61 to rock clockwise about its upper end as a center until the valve spool 66 is moved to intermediate neutral position, cutting off flow of fluid from the lift cylinder 20.

The drive line torque sensed by the coupling 34 will vary from time to time depending on the following: (a) rolling resistance of the tractor, (b) effect of uphill or downhill slopes, (c) unevenness of the land tending to cause the tractor to pitch about a transverse axis and to withdraw the implement from the ground or cause it to penetrate more deeply and (d) changes in resistance of the ground to passage of the implement caused by moisture, soil consistency, etc. The mechanism above described is continually actuated by any change in the sensed drive line torque. Whenever a change occurs which is of sufficient magnitude to move the lift valve spool 66 far enough to permit either admission of fluid to or exhaust of fluid from the lift cylinder 20, a correction of height of the implement will be instituted to bring the drive line torque within the limits determined by the position of the quadrant lever 64. For example, if tractor rolling resistance or resistance to passage of the implement increases, the increased drive line torque sensed by the coupling 34 will cause the lower end of floating lever 52 to move to the left as viewed in FIG. 3, rocking the valve control lever 61 clockwise about its upper end and operating the valve 30 to admit fluid to the lift cylinder 20 and thereby raise the hitch 14 and attached implement. As the hitch 14 is raised, the cam 60 will force the upper end of floating lever 52 to the right as shown in FIG. 3 so as to rotate the valve control lever 61 counterclockwise about its upper end and tend to restore the valve 30 to neutral position. At the same time, reduced torque sensed by the coupling 34 will move the lever 49 counterclockwise, moving the lower end of floating lever 52 to the left, also tending to restore valve 30 to neutral.

Conversely, a drop in drive line torque for any reason will move the lower end of floating lever 52 to the right as viewed in FIG. 3 to move the valve control lever 61 in a similar direction and actuate the valve 30 to permit hydraulic fluid to flow from the lift cylinder 20, thereby lowering the hitch. At the same time, rotation of the cam 60 in a clockwise direction will cause the upper end of the floating lever 52 to move to the left so as to operate valve control lever 61 and restore the valve 30 to neutral position.

The sensitivity of the system and the relative effect of the torque-sensing coupling 34 and the position control cam 60 on the position of the floating lever 52 may be varied by moving the end of link 51 along the slot 70. Lowering the link will make movement of the link more responsive to torque sensing and less responsive to movement caused by the cam 60, while raising the link within the slot will have the opposite effect.

The above-described hydraulic system is not directly responsive to implement draft, and forces communicated to the tractor by the implement supporting links are not sensed in order to control height of the implement. In this respect, this system differs basically from that disclosed in Roeder, U.S. Pat. No. 2,631,514 and that utilized in the well-known Ford tractors. Accordingly, the tractor-attached ends of the lower or upper links 15 and 16 are not used to communicate a force to a draft-sensing mechanism. This permits greater flexibility of implements, and a heavy, overhanging implement does not affect the operation of the control system above described.

In addition, if this drive line torque-sensing system is to be used with implements other than those mounted on the hitch 14, the control valve 30 may be utilized to control flow of fluid to and from a hydraulic cylinder regulating height of an implement mounted elsewhere on the tractor or connected to be towed behind the tractor. For example, a single-acting hydraulic lift cylinder on a wheel-type harrow connected to the back of the tractor may be operated by the lift valve 30 to cause the harrow to lift and lower in response to drive line torque of the tractor. Such a remote cylinder may be connected either in parallel with or in substitution for the lift cylinder 20.

We claim:

1. In a tractor having an engine, a transmission, a rear axle, a pair of driving wheels mounted on the rear axle for propelling the tractor, a drive shaft connecting the transmission and rear axle, implement supporting means on the tractor adapted to receive a ground-working implement, hydraulic cylinder means for raising and lowering said implement supporting means, a source of hydraulic fluid under pressure, valve means for controlling flow of fluid to and from said hydraulic cylinder means for regulating implement height, and a torque-sensing coupling interposed in the drive line between the transmission and rear axle and operatively connected to said valve means for controlling said valve means to raise the implement upon said drive line torque exceeding a predetermined figure and lower the implement upon drive line torque dropping below a slightly lower predetermined figure so as to maintain a substantially uniform predetermined drive line torque during operation with the implement in ground-engaging position.

2. In a tractor as claimed in claim 1, having manually settable means operatively connected to said valve means for predetermining the drive line torque.

3. In a tractor as claimed in claim 1, the torque-sensing coupling comprising a two-part coupling interposed in the drive line, one part of the coupling being circumferentially displaceable relative to the other part proportional to the amount of torque transmitted.

4. In a tractor as claimed in claim 1, means operatively connected with said ground engaging implement supporting hitch and said valve means for controlling the valve means in response to implement height and means operatively connected with said valve means and said torque-sensing means for varying the relative effect on the valve means of implement height and of drive line torque.

5. In a tractor as claimed in claim 1, in which the means for controlling the valve means includes a valve operating lever having one end portion manually positionable to predetermine the operating drive line torque, another portion connected with the valve means for operation of the valve means responsive to movement of the lever and a third portion moved responsive to variations in tractor drive line torque.

6. In a tractor as claimed in claim 5, a floating lever having one end displaced responsive to implement height, the other end displaced responsive to drive line torque, and an intermediate portion linked to the valve operating lever for displacing it responsive to change in implement height and change in drive line torque.

7. In a tractor as claimed in claim 6, the link connecting the valve operating lever and the floating lever having a connection with the floating lever movable from the implement height controlled end of the lever at least most of the way towards the other end of the lever.